(12) United States Patent
Yeh et al.

(10) Patent No.: US 9,437,900 B2
(45) Date of Patent: Sep. 6, 2016

(54) ELECTROLYTE, METHOD FOR FABRICATING ELECTROLYTE SOLUTION, AND LITHIUM ION BATTERY

(75) Inventors: Ting-Ju Yeh, Taipei (TW); Shih-Chieh Liao, Zhongli (TW); Jin-Ming Chen, Taoyuan (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 803 days.

(21) Appl. No.: 13/596,760

(22) Filed: Aug. 28, 2012

(65) Prior Publication Data

US 2013/0157123 A1  Jun. 20, 2013

(30) Foreign Application Priority Data

Dec. 20, 2011 (TW) .............................. 100147278 A

(51) Int. Cl.
| | | |
|---|---|---|
| H01M 10/056 | (2010.01) | |
| H01M 10/0567 | (2010.01) | |
| H01M 10/0525 | (2010.01) | |

(52) U.S. Cl.
CPC ..... *H01M 10/0567* (2013.01); *H01M 10/0525* (2013.01); *H01M 2300/0025* (2013.01); *Y02E 60/122* (2013.01)

(58) Field of Classification Search
CPC ............... H01M 10/0525; H01M 10/0567; H01M 2300/0025; Y02E 60/122
See application file for complete search history.

(56) References Cited

U.S. PATENT DOCUMENTS

| | | |
|---|---|---|
| 6,544,689 B1 * | 4/2003 | Riley et al. .................. 429/302 |
| 7,709,420 B2 | 5/2010 | Lewis et al. |
| 7,745,052 B2 | 6/2010 | Paulsen et al. |
| 2004/0126667 A1 | 7/2004 | Sandi-Tapia et al. |
| 2007/0155629 A1 | 7/2007 | Lewis et al. |
| 2010/0003597 A1 | 1/2010 | Tsunashima et al. |
| 2010/0248025 A1 * | 9/2010 | Kimura et al. ............... 429/207 |

FOREIGN PATENT DOCUMENTS

| | | |
|---|---|---|
| JP | 2011134459 A * | 7/2011 |
| KR | 100788211 | 12/2007 |
| TW | 586248 | 5/2004 |
| TW | 586248 B | 5/2004 |
| TW | 200411965 | 7/2004 |
| TW | I263628 | 10/2006 |
| WO | WO 2011/024782 A1 | 3/2011 |

OTHER PUBLICATIONS

Mei-Chun Lai, et al., "Synthesis and Property Studies of Organic-Based Polyimide/Clay Nanocomposite Materials Nanocomposite Materials and Water-based Polyacrylate Latex/Clay Nanocomposite Materials", the essay of master degree, Chun Yuan Christian University Department of Chemistry, Jun. 2005, 2 pages.
Chung-Feng Dai, et al., "Preparation and Property Studies of Epoxy Resin Nanocomposite Materials and Epoxy Resin Porous Materials", the essay of master degree, Chung Yuan Christian University Department of Chemistry, Jun. 2006, 2 pages.
Taiwanese Office Action dated Nov. 12, 2013, as issued in Taiwan Patent Application No. 100147278.
CN Office Action dated Aug. 19, 2014.
Y.W.Chen-Yang et al., "Effect of the addition of hydrophobic clay on the electrochemical property of polyacrylonitrile/LiClO4 polymer electrolytes for lithium battery", Polymer 50 (2009), pp. 2856-2862.
Seok Kim et al., "Preparation and ion-conducting behaviors of poly (ethylene oxide)-composite electrolytes containing lithium montmorillonite", Solid States Ionics, I78(2007), pp. 973-979.
Soek Kim et al., "Ionic conductivity of polymeric nanocomposite electrolytes based on poly(ethylene oxide) and organo-clay materials", Colloids and Surfaces A: Physicochem. Eng. Aspects, 2008 pp. 216-219.
Reinholdt, M. X., et al., "Montmorillonite-poly(ethylene oxide) nanocomposites: Interlayer alkali metal behavior" Journal of Physical Chemistry B, 2005, 109, pp. 16296-16303.

\* cited by examiner

*Primary Examiner* — Carlos Barcena
(74) *Attorney, Agent, or Firm* — Muncy, Geissler, Olds & Lowe, P.C.

(57) ABSTRACT

An electrolyte for a lithium ion battery is provided, including a carrier, a lithium salt dissolved in the carrier, and an additive uniformly dispersed in the carrier, wherein the additive is an inorganic clay modified by an organic quaternary phosphonium salt. Also provided is a method for fabricating an electrolyte solution and a lithium ion battery.

15 Claims, 11 Drawing Sheets

ELECTROLYTE, METHOD FOR FABRICATING ELECTROLYTE SOLUTION, AND LITHIUM ION BATTERY

CROSS REFERENCE TO RELATED APPLICATION

The present application is based on, and claims priority from, Taiwan Application Serial Number 100147278, filed on Dec. 20, 2011, the disclosure of which is hereby incorporated by reference herein in its entirety.

BACKGROUND

1. Field of the Invention

The disclosure relates to an electrolyte and in particular to an electrolyte for lithium ion battery, fabrication method thereof, and a lithium ion battery using the same.

2. Description of the Related Art

Lithium ion batteries are mainly composed of a cathode of lithium alloy oxide, an electrolyte, and an anode of carbon material, lithium metal and oxides thereof. The lithium ion batteries are mainly applied in computers, communication, and consumer electronic (3C) product applications such as cell phones, laptop computers, digital cameras, and video cameras, and are secondarily applied in power lithium cells for electric vehicles to provide high power density.

Nevertheless, the electrolyte in the lithium ion batteries may easily be decomposed into gases such as carbon dioxide due to high temperature and over charging, thereby causing swelling issues and degrading cycling life thereof. In addition, conventional anode materials such as mesocarbon microbeads (MCMBs) and graphite electrodes may be easily peeled off from the cathode due to co-intercalation effects between the electrolyte and the lithium ions ($Li^+$), thereby degrading cycling life of the batteries and increasing irreversible capacities.

SUMMARY

An exemplary electrolyte for a lithium ion battery is provided, comprising: a carrier; a lithium salt dissolved in the carrier; and an additive uniformly dispersed in the carrier, wherein the additive is an inorganic clay modified by an organic quaternary phosphonium salt.

An exemplary method for fabricating an electrolyte solution is also provided, comprising: providing an organic solution; providing a modifier to the organic solution, forming a first mixture solution, wherein the modifier comprises an organic quaternary phosphonium salt; providing a clay-containing organic solution and mixing the solution with the first mixture solution, forming a second mixture solution, wherein the clay-containing organic solution comprises inorganic clay; and dissolving a lithium salt in the second mixture solution, thereby obtaining the electrolyte solution.

An exemplary lithium ion battery is also provided, comprising: an anode; a cathode; and an ion-conducting layer sandwiched between the cathode and the anode, wherein the ion-conducting layer comprises the above disclosed electrolyte.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
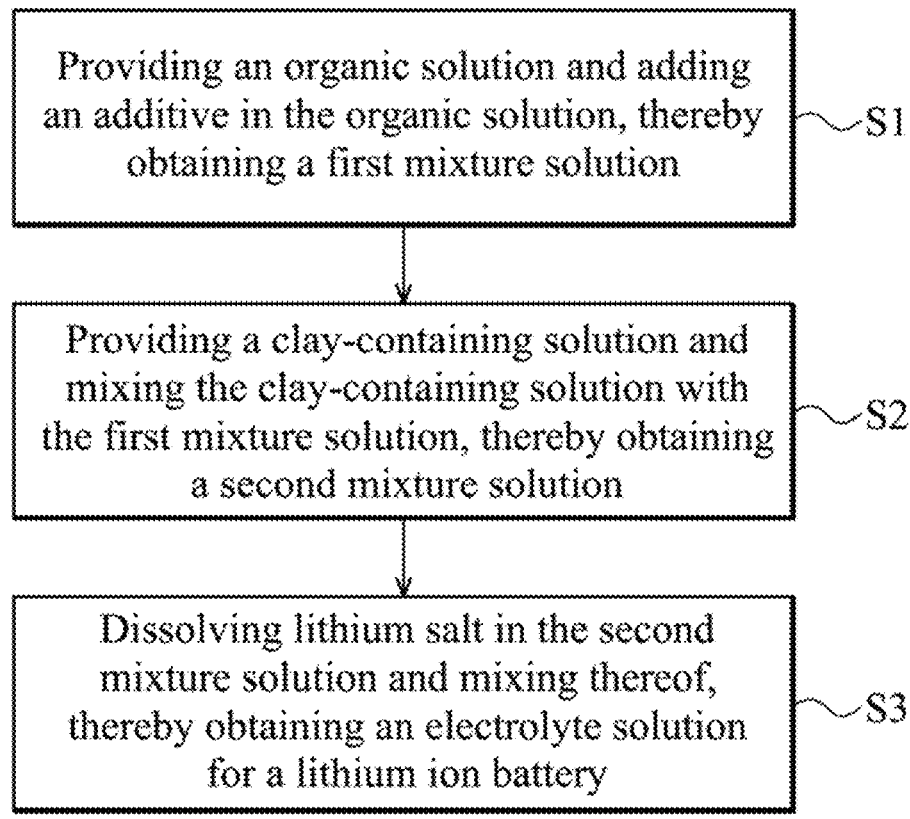
FIG. 1 shows a method for fabricating an electrolyte according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows an exemplary method for fabricating an electrolyte for a lithium ion battery.

As shown in FIG. 1, in Step S1, an organic solution of, for example, carbonates or esters are first provided. In one embodiment, the organic solution comprises at least one kind of carbonates, such as cyclic carbonates, chain-shaped carbonates, or combinations thereof. The carbonates may comprise, for example, ethylene carbonate (EC), propylene carbonate (PC), dimethyl carbonate (DMC), diethyl carbonate (DEC), ethyl methyl carbonate (EMC) or chain-shaped esters, cyclic esters and combinations thereof, such as methyl Acetate (MA), ethyl acetate (EA), methyl formate (MF), γ-Butyrolactone (GBL), and γ-Valerolactone (GVL), and are provided with an optimum ratio. The above optimum ratio is defined as a volume ratio of the solvent solution having a maximum conductivity. Next, an additive is added into the above organic solution to obtain a first mixture solution. Herein, the additive can be, for example, an organic quaternary phosphonium salt, and the additive functions as a modifier to modify a clay which is sequentially added.

Next, in Step S2, a clay-containing organic solution is provided. The clay-containing organic solution is obtained by adding an inorganic clay into an organic solution, and embodiments of the organic solution are the same as that of the organic solution used in the first mixture solution. Type and composition of the organic solutions are the same in both of the clay-containing organic solution and the first mixture solution. In one embodiment, the above inorganic clay may comprise, for example, montmorillonite, beidellite, canbyite, semctite, kaolium, or mica, and the added clay may have been purified by performing processes such as dipping, rinsing and dehydrating for several times. In one embodiment, the organic clay may have a nano layer structure, and the nano layer structure may comprise two layers of tetrahedral silicon dioxide and one layer of octahedral aluminum hydroxide. Next, the clay-containing solution and the first mixed organic solution are mixed and well stirred for 24 hours, thereby obtaining a second mixture solution.

Therefore, the inorganic clay can be uniformly dispersed in the organic solutions, and the dispersed inorganic clay is then modified by the modifier, thereby enlarging an interlayer pitch thereof for mixing well with the organic solution. Therefore, the inorganic clay can be modified into a hydrophobic clay in the second mixture solution, and an interlayer pitch therein can be enlarged to facilitate the transfer of lithium ions therein. The above modified hydrophobic clay can be represented as Formula (1) as follows:

In another embodiment, the organic quaternary phosphonium salt added in the Step S1 can be represented by Formula (3) as follows:

wherein R is an alkyl group, a halogenated carbon group, or an ester group, and $B^-$ is an anion such as $PF_6^-$, $ClO_4^-$, $BF_4^-$ or $TFSI^-$.

Next, Step S3 is performed to dissolve and mix a lithium salt in the second mixture solution, thereby obtaining an electrolyte solution for a lithium ion battery. In one embodiment, the added lithium salt may comprise, for example, $LiPF_6$, LiBOB, $LiBF_4$, $LiClO_4$, or a lithium salt having a central atom of C, N, B, or Al. In one embodiment, the previously added additive is about 0.05-5 wt % of the electrolyte solution, and the previously added inorganic clay

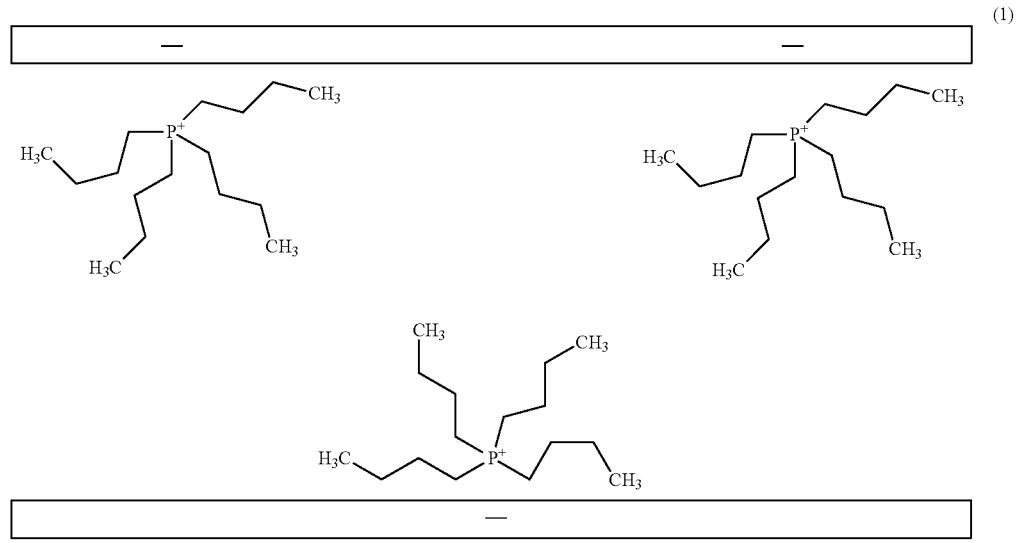 [SMILES: CCCC[P+](CCCC)(CCCC)CCCC ; CCCC[P+](CCCC)(CCCC)CCCC ; CCCC[P+](CCCC)(CCCC)CCCC]

In one embodiment, the organic quaternary phosphonium salt added in the Step S1 can be, for example, a tetra-butyl phosphene (TBP) represented by Formula (2) as follows:

is about 0.1-5 wt % of the electrolyte solution, and the previously added lithium salt is about 5-25 wt % of the electrolyte solution.

The method for fabricating an electrolyte solution as illustrated in FIG. 1 may uniformly disperse an inorganic clay in an organic solution, and the inorganic clay can be modified by an additive to enlarge an interlayer-pitch thereof, which facilitates uniform mixing thereof with the organic solution. Thus, the obtained electrolyte solution may comprise an hydrophobic clay having the following advantages:

1. Due to negative charges from the inherent polarity of the added inorganic clay, ionization of the lithium salt can be increased for attracting the lithium ions ($Li^+$) and breaking bonding energy between lithium ions and the negative ions in the lithium salt, thereby increasing a conductivity of the electrolyte. This is good for facilitating large current discharge of a lithium ion battery.

2. An interlayer pitch of the modified hydrophobic clay can be enlarged, and a surface thereof is negatively charged, such that the lithium ions (Li+) may transfer in the interlayer and effectively restrain formation of the LiF, thereby reducing a resistance of the solid electrolyte interface ($R_{SEI}$) and an irreversible capacity.

3. Since the added inorganic clay is provided with a regular layer structure of, for example, two layers of tetrahedral silicon dioxide ($SiO_2$) and one layer of octahedral aluminum hydroxide ($Al_2O_3$). Due to good thermal stability of the silicon dioxide, the duration of the electrolyte under high temperatures can be increased, and the electrolyte solution will not decompose under high temperature when the silicon dioxide is added.

4. Since the added inorganic clay is provided with a regular layer structure, currents are not conductive along a vertical direction of the regular layer structure. This may effectively prevent the electrolyte from being decomposed under high voltage, and negative charges may remain on the surface of the regular layer structure, which allows rapid transfer of lithium ions and dispersing of charges during overcharging. Therefore, a decomposing voltage of the electrolyte can be increased.

In the method for fabricating the electrolyte as illustrated in FIG. 1, the organic solution is used as a carrier to form an electrolyte solution for a lithium ion battery. In addition to the above organic solution, the modified hydrophobic clay can also be uniformly dispersed in a gel carrier such as polyethylene oxide (PEO), phenylene oxide (PPO), or polyacrylonitrile (PAN), and in a solid carrier such as polydimethylsiloxane (PDMS), or polyvinylchloride (PVC) by the above fabrication method to form a gel electrolyte or a solid electrolyte for a lithium ion battery. Therefore, the formed gel electrolyte or solid electrolyte for the lithium ion battery can be provided with high thermal stability, high voltage duration and low irreversible capacity.

Figure 2:
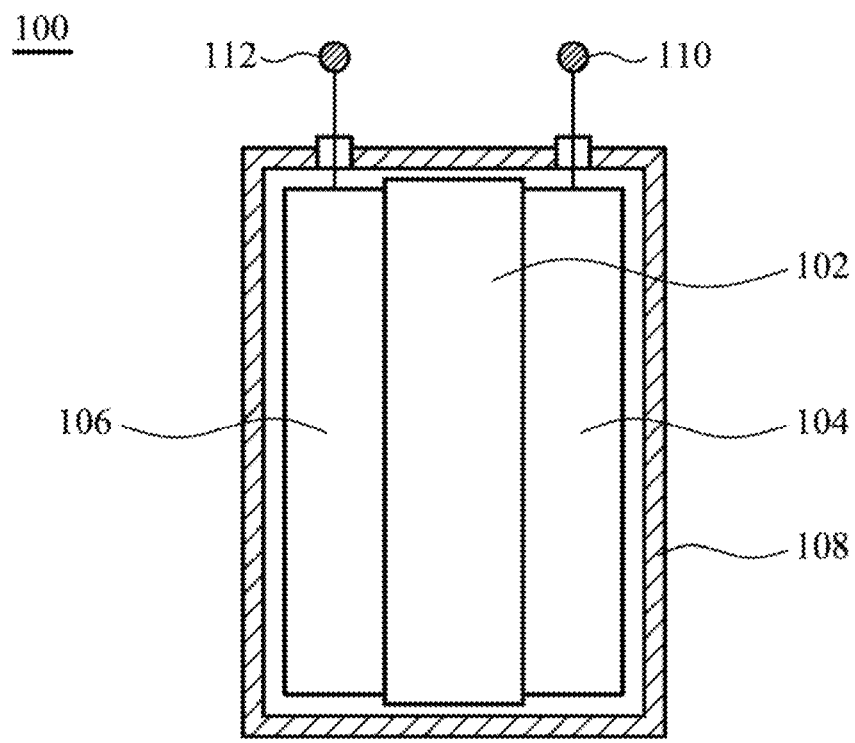
FIG. 2 is a schematic diagram showing a lithium ion battery according to an embodiment of the invention.

FIG. 2 shows an exemplary lithium ion battery 100 with a column configuration, including an oppositely disposed anode 106 and cathode 104. The anode 106 and the cathode 104 are isolated by an ionic conductor layer 102. The anode 106, the cathode 104 and the ionic conductor layer 102 are encapsulated by a housing 108, and the cathode 104 and the anode 106 are respectively connected with an anode terminal 112 and a cathode terminal 110. In the lithium ion battery as shown in FIG. 2, the cathode 104 includes a plate of materials such as $LiFePO_4$, $LiMn_2O_4$, $LiCoO_2$, $LiNi_xCo_yO_2$, $LiNi_xMn_yO_4$ or $LiNi_xCo_yMn_zO_2$, and the anode 106 includes a plate of materials such as carbon, graphite, mesocarbon microbeads (MCMB) or lithium, and the ionic conductor layer 102 includes a liquid, gel or solid electrolyte containing the above mentioned modified clay. By using the ionic conductor layer 102 including the electrolyte having a modified clay of the invention, duration of the lithium ion battery 100 under high temperature/voltage can be improved, and the irreversible capacity at the anode can be reduced, thereby improving a cycling life of the lithium ion battery 100.

Figure 3:
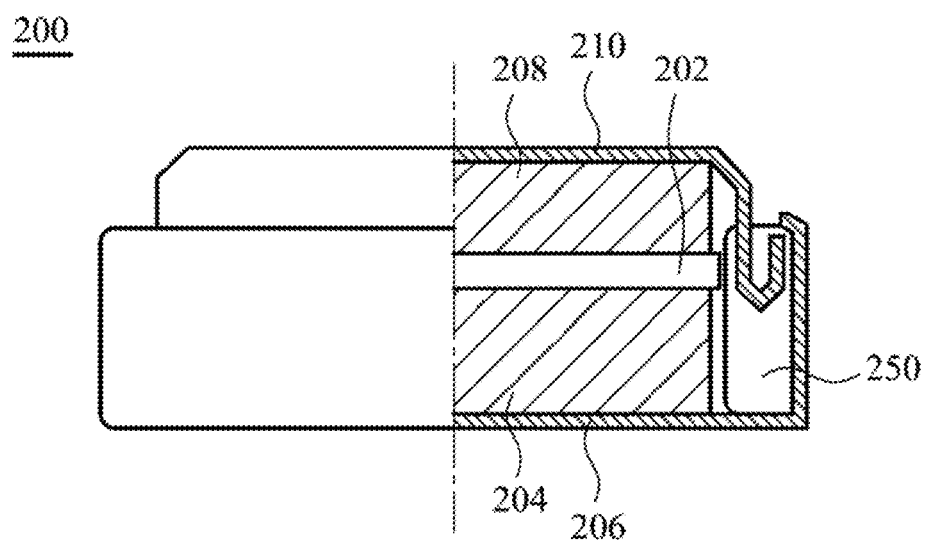
FIG. 3 is a schematic diagram showing a lithium ion battery according to another embodiment of the invention.

FIG. 3 is a schematic diagram showing another exemplary lithium ion battery 200, having a button configuration. The lithium ion battery includes a cathode 204 of a cathodal material layer and an anode 208 of an anode material layer. The cathode 204 is stacked and disposed over the anode 208, and an ionic conductor layer 202 is sandwiched between the anode 208 and the cathode 204. The stacked anode 204, the ionic conductor layer 202 and the cathode layer 204 are encapsulated by a cathodal case 206 at the cathodal side and by an anode case 210 at the anode side. The cathodal case 206 and the anode case 210 can function as a cathode terminal and an anode terminal, respectively. Herein, a gasket 250 is embedded within a part of the cathodal case 206 to prevent the material in the lithium secondary cell 200 from leaking.

In the lithium ion battery as shown in FIG. 3, the cathode 204 includes $LiFePO_4$, $LiMn_2O_4$, $LiCoO_2$, $LiNi_xCo_yO_2$, $LiNi_xMn_yO_4$ or $LiNi_xCo_yMn_zO_2$ and the anode 208 includes materials such as carbon, graphite, mesocarbon microbeads (MCMB) or lithium, and the ionic conductor layer 202 includes a liquid, gel or solid electrolyte containing the above mentioned modified clay. By using the ionic conductor layer 202 including the electrolyte having a modified clay of the invention, duration of the lithium ion battery 200 under high temperature/voltage can be improved, and the irreversible capacity at the anode can be reduced, thereby improving a cycling life of the lithium ion battery 200.

EXAMPLES

Example 1

An inorganic clay was processed by repeating processes comprising dipping, rinsing and dehydrating for several times, thereby obtaining a purified inorganic clay. 0.5 g of the purified inorganic clay was weighted and mixed with 50 ml of a carbonate-based organic solution mixed according to a predetermined volume ratio (EC:DMC:EMC=2:3:1). Next, 0.2 g of tributyl phosphate (TBP) was dissolved in 50 ml of another carbonate-based organic solution mixed according to the same predetermined volume ratio (EC:DMC:EMC=2:3:1), for functioning as a modifier, and then mixed with the clay-containing organic solution and stirred for 24 hrs to perform cation exchanges. Next, 1 M of $LiPF_6$ was added to form an electrolyte solution for a lithium ion battery.

Comparative Example 1

In the present comparative example, fabrication of an electrolyte solution for a lithium ion battery was the same as that disclosed in Example 1. However, the modifier and the inorganic clay were not added in the Comparative Example 1 to form an electrolyte solution for a lithium ion battery.

Comparative Example 2

In the present comparative example, fabrication of an electrolyte solution for a lithium ion battery was the same as that disclosed in Example 1. However, the modifier and the inorganic clay were replaced by 1 wt % of vinylene carbonate (VC) in the Comparative Example 2 to form an electrolyte solution for a lithium ion battery.

Battery Assembly
Fabrication of a Cathode Plate

Powders of $LiFePO_4$, polymer of vinylidene fluoride (PVDF) and conductive carbon were weighted and mixed according a weight ratio of about 85:9:6 to form a mixture having a total weight of about 20 g. Powders of the mixture were grinded and mixed, and was then added in a PVDF solution (containing 18 ml of N-Methyl-2-pyrrolidone (NMP)) to form a paste-like slurry after mixing thereof. The paste-like slurry was then coated over an aluminum foil, and a 150 µm scraper was used to even the coated pasted slurry and obtain a cathode plate. The cathode plate was baked in an oven at 110° C. for 12 hrs to remove the NMP. Next, the cathode plate was grinded to a thickness of about 80% of its original thickness and was then cut into a circle plate having a diameter of 12 mm.

Fabrication of an Anode Plate

Powders of mesocarbon microbeads (MCMB), polymer of vinylidene fluoride (PVDF) and conductive carbon were weighted and mixed according a weight ratio of about 93:6:1 to form a mixture of a total weight of about 20 g. Powders of the mixture were grinded and mixed, and were then added in a PVDF solution (containing 14 ml of N-Methyl-2-pyrrolidone (NMP)) to form a paste-like slurry after mixing thereof. The paste-like slurry was then coated over an aluminum foil, and a 150 μm scraper was used to even the coated paste-like slurry to obtain an anode plate. The anode plate was baked in an oven at 110° C. for 12 hrs to remove the NMP. Next, the anode plate was grinded to a thickness of about 80% of its original thickness and was then cut into a circle plate having a diameter of 13 mm.

Assembly of a Button Type Battery

Figure 4:
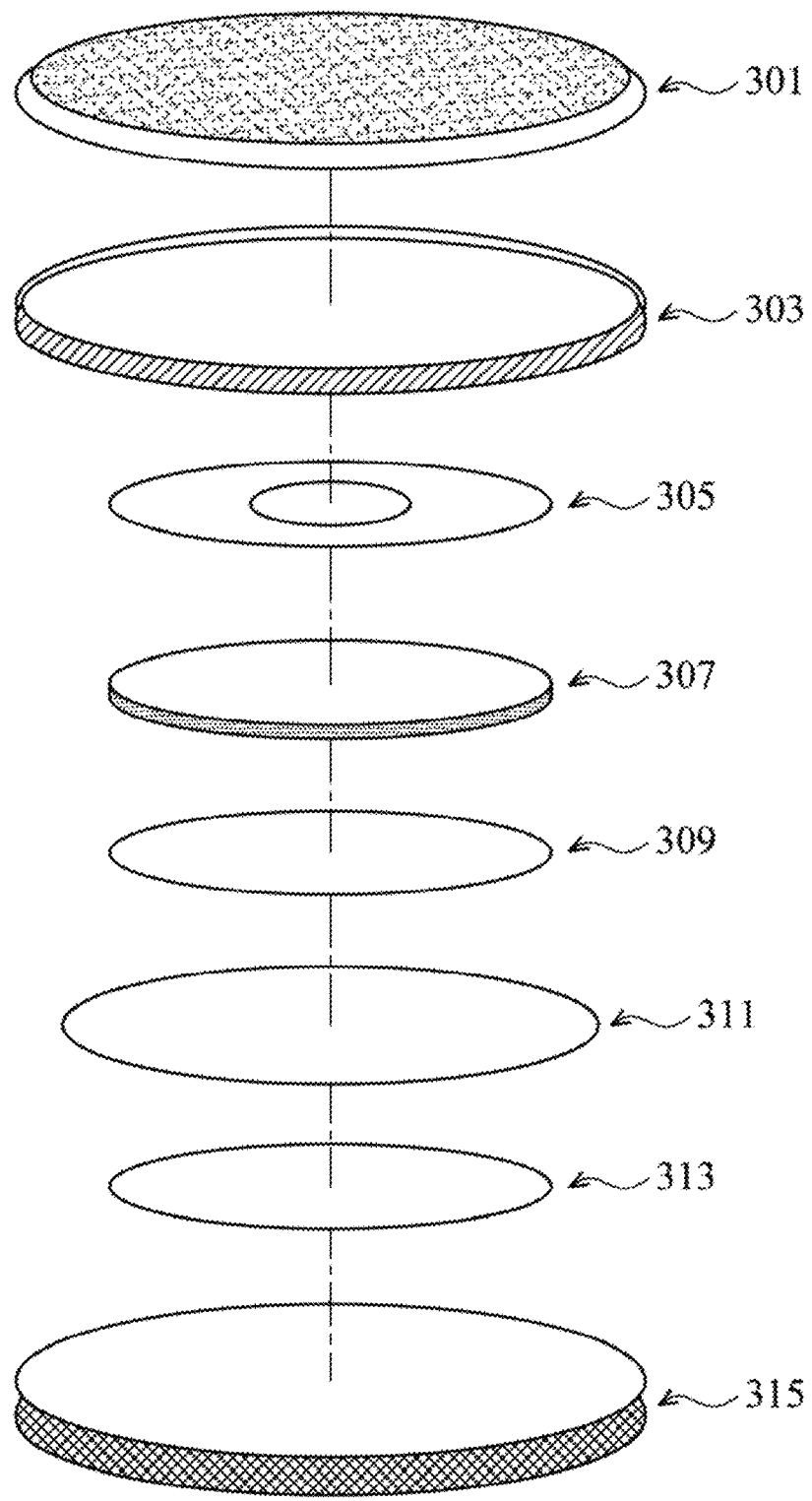
FIG. 4 is a schematic diagram showing a button type battery according to an embodiment of the invention.

After cutting the anode plate and the cathode plate into a circle plate having a diameter of 12 mm and 13 mm, respectively, components of a complete button type battery (LiFePO$_4$/mesocarbon microbeads, MCMB) were disposed in a glove box, and the components such as a top cover 301, a plastic ring 303, a coiled spring sheet 305, a stainless circular sheet 307, an anode plate 309, an insulating film 311, a cathode plate 313 and a lower cover 315 were assembled as that illustrated in FIG. 4 and an electrolyte such as the electrolyte disclosed in Example 1 or Comparative Example 1 or 2 was previously filled the battery prior to sealing thereof. The battery was sealed in the glove box under a pressure of about 200 psi to ensure air tightness therein. A half battery assembly was similarly formed according to that disclosed above, but one of the cathode plate or the anode plate was replaced by lithium to form a LiFePO$_4$/Li or MCMB/Li button type half battery.

Analysis was conducted in relation to thermal stability and decomposing potential of the electrolyte for the lithium ion batteries as disclosed in Example 1 and Comparative Examples 1 and 2, and tests were preformed, for example, irreversible capacity, AC resistance, surface analysis at anodes, large current discharge, cycling life of a half battery or a complete battery using LiFeO$_4$ and MCMB.

Thermal Stability Analyses

Figure 5:
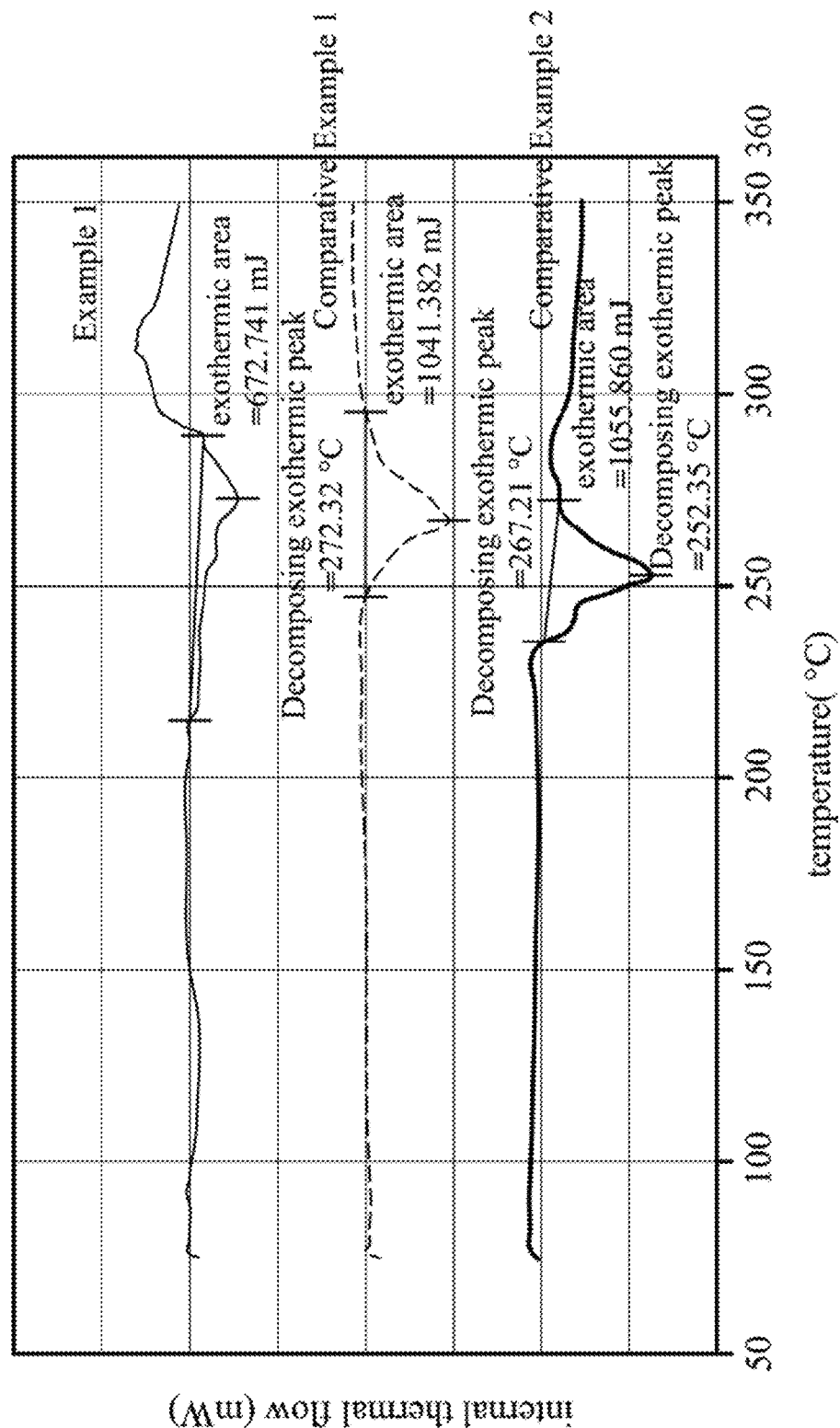
FIG. 5 shows thermal stability performance of electrolyte solutions according to various comparative examples and various examples of the invention.

FIG. 5 shows thermal stability performances of various electrolytes according to Example 1 and Comparative Examples 1 and 2. As shown in FIG. 5, through analysis of differential scanning calorimeters (DSC), the electrolytes of Example 1 and Comparative Examples 1 and 2 showed a decomposing exothermic peak at a temperature of about 260° C. This was caused by formation of silicon dioxide and ring-opening polymerization of a cyclic ester in the electrolytes. As shown in FIG. 5, by adding of the 1 wt % VC in Comparative example 2, the exothermic peak happened earlier, and by adding the modified clay in Example 1, the exothermic peak moved toward to a higher temperature and an exothermic area was reduced to 673 mJ from its original 1041 mJ. Therefore, the modified clay effectively restrained decomposition of the electrolyte under a high temperature.

Decomposing Potential Analyses

Figure 6:
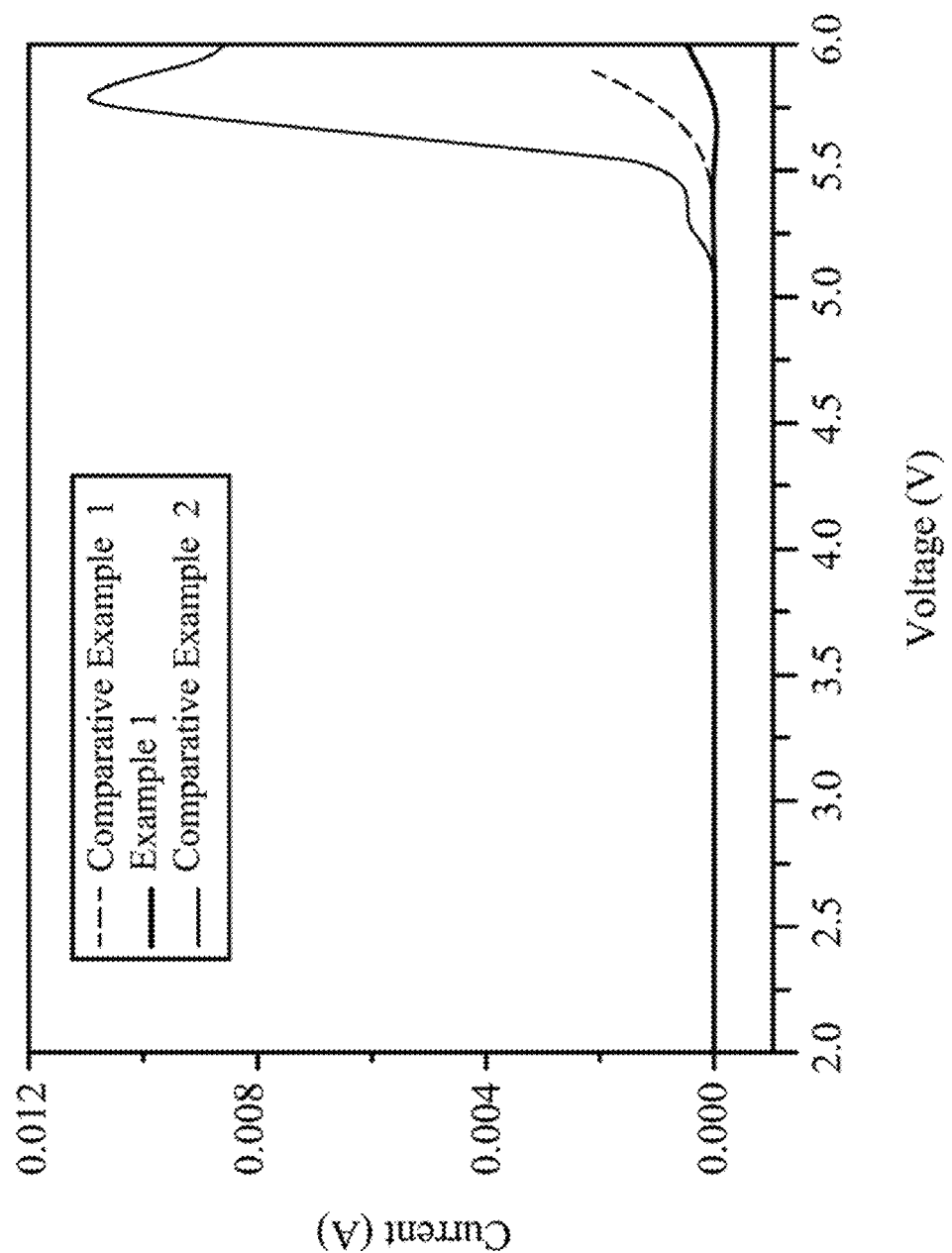
FIG. 6 shows decomposing potential performances of an electrolyte solution according to various comparative examples and various examples of the invention.

FIG. 6 shows decomposing potential performances of various electrolytes according to Embodiment 1 and Comparative embodiments 1 and 2. As shown in FIG. 6, through analysis of a linear scanning voltammetry (LSV) at a voltage varied from 2V to 6V, the stability of the electrolyte under high voltage was improved by adding the modified clay. By adding 1 wt % VC in the electrolyte of Comparative example 2, a decomposing potential of 5.1 V was measured, which was reduced when compared to that when no additive was added in the electrolyte of Comparative example 1, and a decomposing potential of the electrolyte of Example 1 was increased from 5.5V to 5.9V through adding the modified clay. Therefore, the modified clay effectively restrained decomposition of the electrolyte under a high voltage.

Irreversible Capacity

Figure 7:
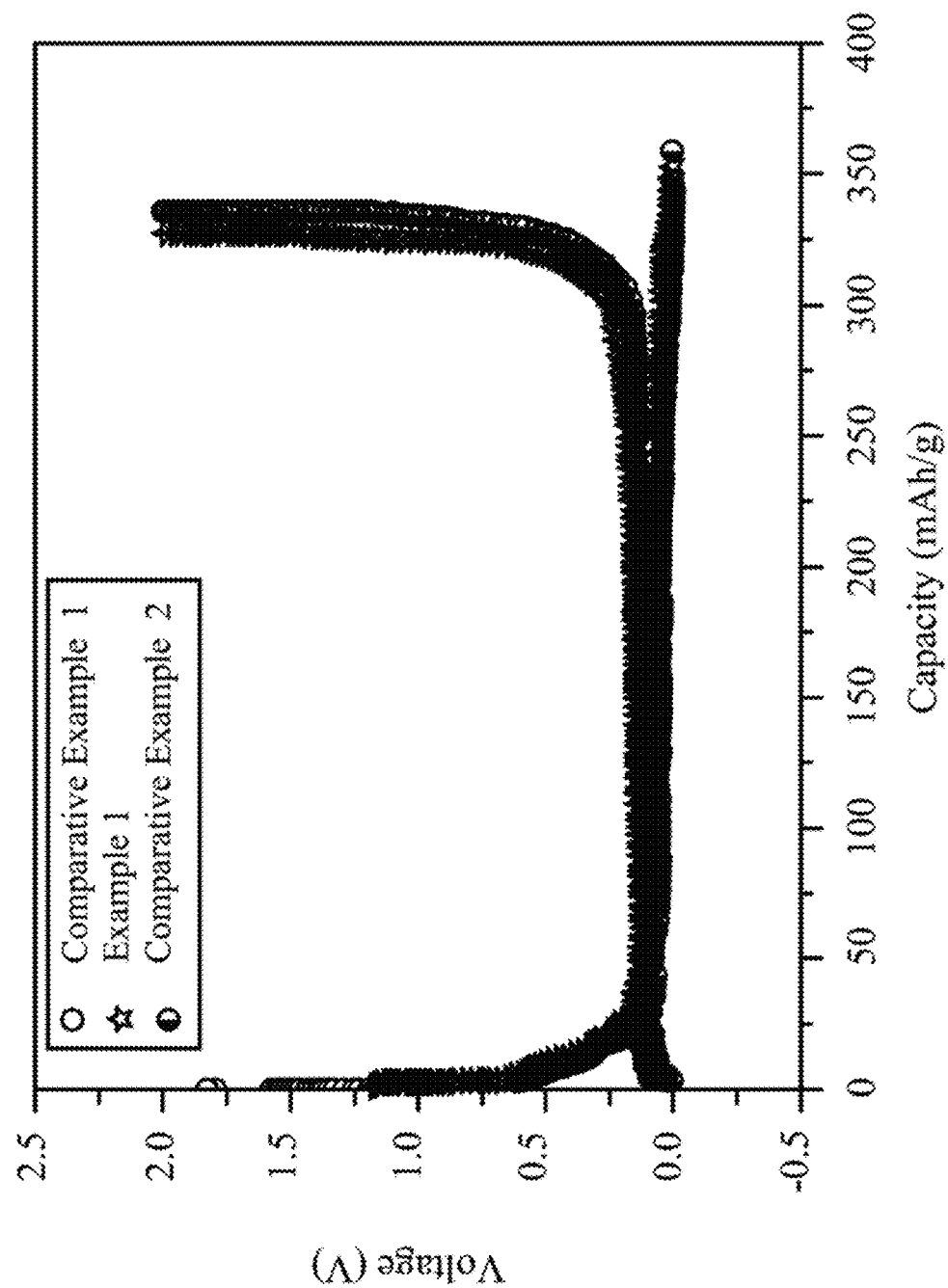
FIG. 7 shows test results of irreversible capacity of a button type half battery (MCMB/lithium) comprising an electrolyte according to various comparative examples and various examples of the invention.

FIG. 7 shows test results of an irreversible capacity of a button type half battery (MCMB/lithium) comprising various electrolytes according to Example 1 and Comparative Examples 1 and 2. During the test, the battery was charged to 5 mV in 0.05 C, and was then discharged to 2 V in 0.05 C, thereby obtaining a difference between the irreversible capacity of the battery using various additives. As shown in FIG. 7, the button type battery using the electrolyte without any additive in Comparative Example 1 showed an irreversible capacity of 27 mAh/g, and the button type battery using the electrolyte having the 1 wt % of VC as an additive in Comparative Example 2 showed an irreversible capacity of 26 mAh/g, and the button type battery using the electrolyte having the modified clay as an additive in Example 1 showed an irreversible capacity of 22 mAh/g. Therefore, a reduction of the irreversible capacity of about 18.8% of the battery was achieved by using the electrolyte having the modified clay.

AC Resistance Test

Figure 8:
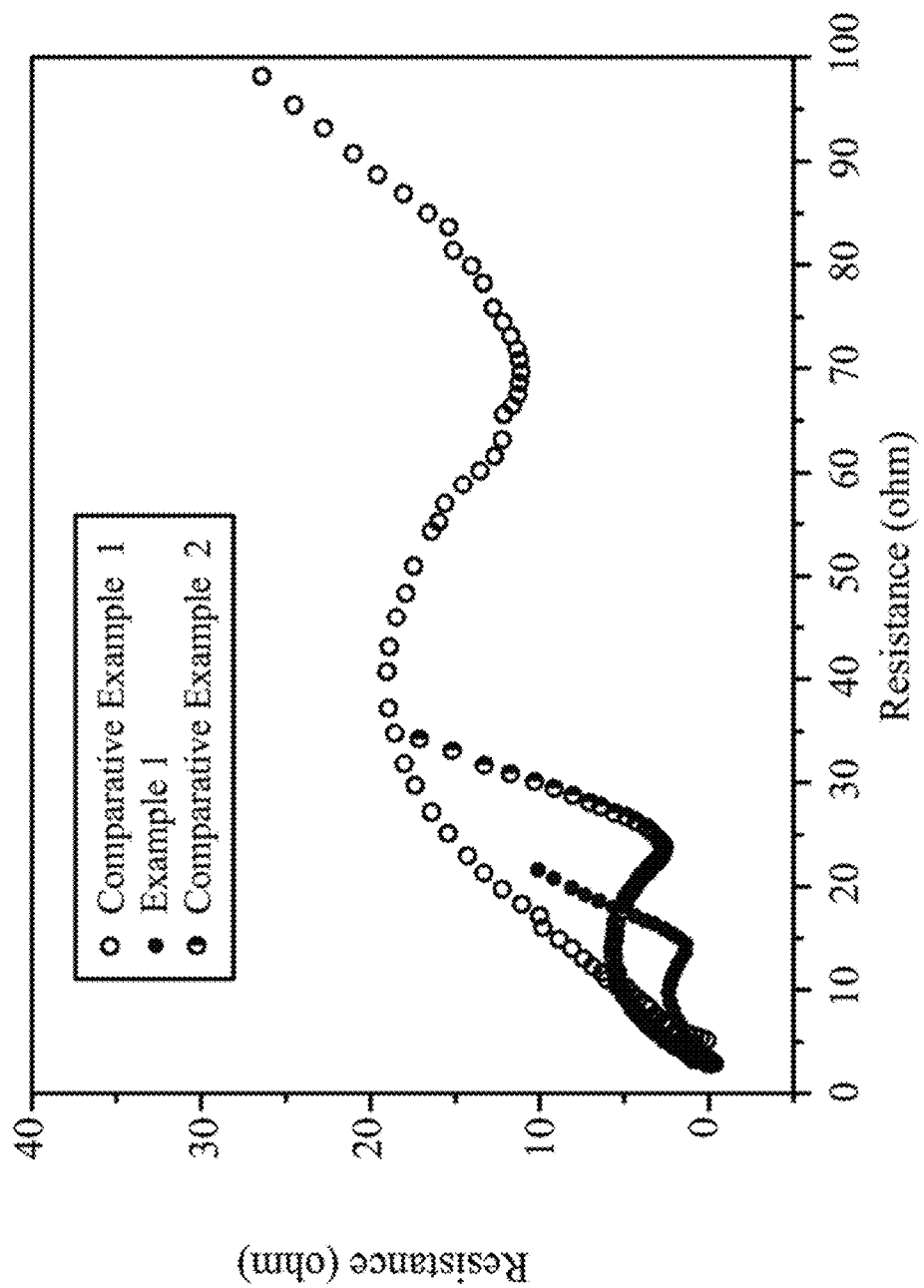
FIG. 8 shows test results of AC resistance of a button type half battery (MCMB/lithium) comprising an electrolyte according to various comparative examples and various examples of the invention.

FIG. 8 shows test results of an AC resistance of a button type half battery (MCMB/lithium) comprising various electrolytes according to Example 1 and Comparative Examples 1 and 2. After 40 times of charge and discharge operations, the button type half battery comprising the electrolyte in Example 1 showed the smallest SEI resistance ($R_{SEI}$=9Ω), and the button type half battery comprising the electrolyte in Comparative Example 2 showed an intermediate SEI resistance ($R_{SEI}$=20Ω), and the button type half battery comprising the electrolyte in Comparative Example 1 showed the largest SEI resistance ($R_{SEI}$=63Ω). Through the test results shown in FIG. 8, the SEI resistance can be reduced by adding the VC and the modified clay, and a speed of intercalation and deintercalation of Li+ can also be improved and the irreversible capacity of the battery can also be decreased.

Surface Analysis at the Anode Plate

Figure 9A:
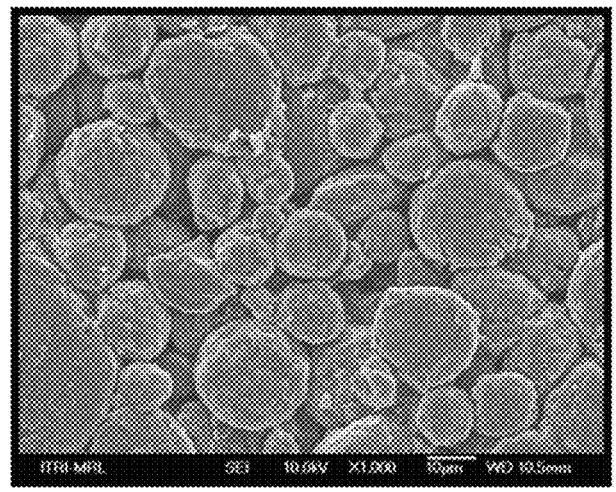
FIGS. 9A, 9B, 9C, 9D show SEM surface analyzing results of a MCMB substrate in a button type half battery (MCMB/lithium) comprising an electrolyte according to various comparative examples and examples of the invention.
Figure 9B:
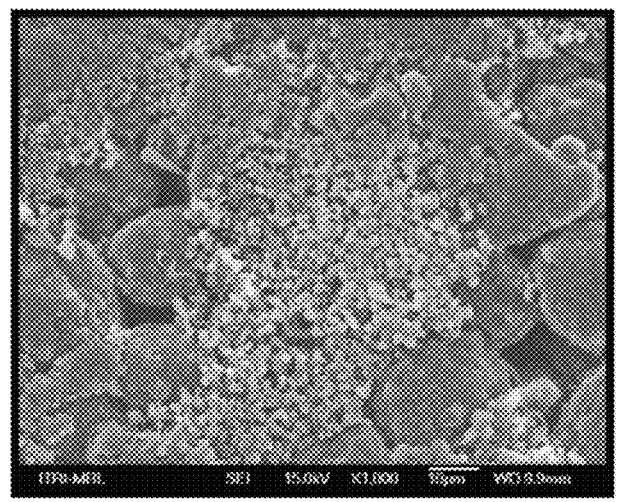
Figure 9C:
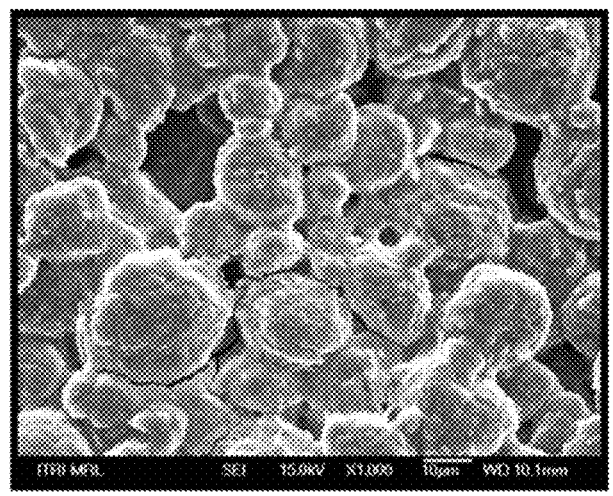
Figure 9D:
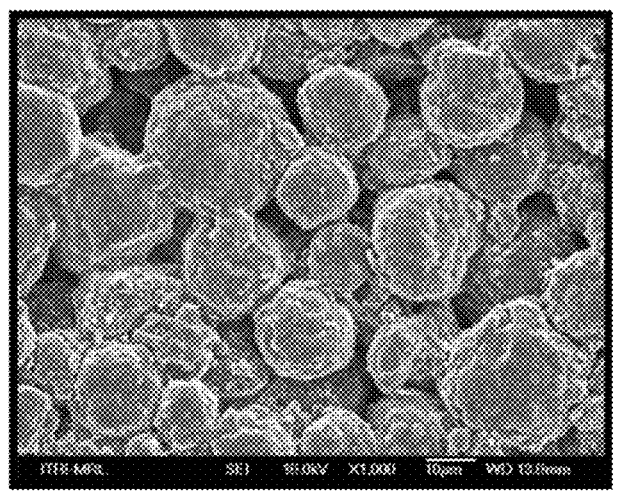

FIGS. 9A, 9B, 9C, 9D show SEM surface analysis results of an anode plate of a button type half battery (MCMB/lithium metal) comprising various electrolytes according to Example 1 and Comparative Examples 1 and 2. The button type half battery (MCMB/lithium metal) comprising the electrolytes of Example 1 and Comparative Examples 1 and 2 were charged and discharged for 40 times, and then surface differences at the anode plate thereof were examined. As shown in FIG. 9A, a surface of the anode plate prior to performing charge and discharge operations is shown. FIG. 9B shows a surface of the anode plate of the button type half battery using the electrolyte in Comparative Example 1, and after 40 times of charge and discharge operations, small grains of LiF were obviously observed. FIG. 9C shows a surface of the anode plate of the button type half battery using the electrolyte of Comparative Example 2, and after 40 times of charge and discharge operations, although no grains of LiF were obviously observed, cracking was observed at the surface of the anode plate due to the charge and discharge operations. FIG. 9D shows a surface of the anode plate of the button type half battery using the electrolyte of Example 1, and after 40 times of charge and discharge operations, no obvious difference was observed except for a layer of a solid electrolyte interface being formed. Thus, it was observed that no LiF will be formed when the modified clay is added, and no cracking will be caused at the anode plate due to formation of the solid electrolyte interface (SEI).

Large Current Discharge Tests

Figure 10:
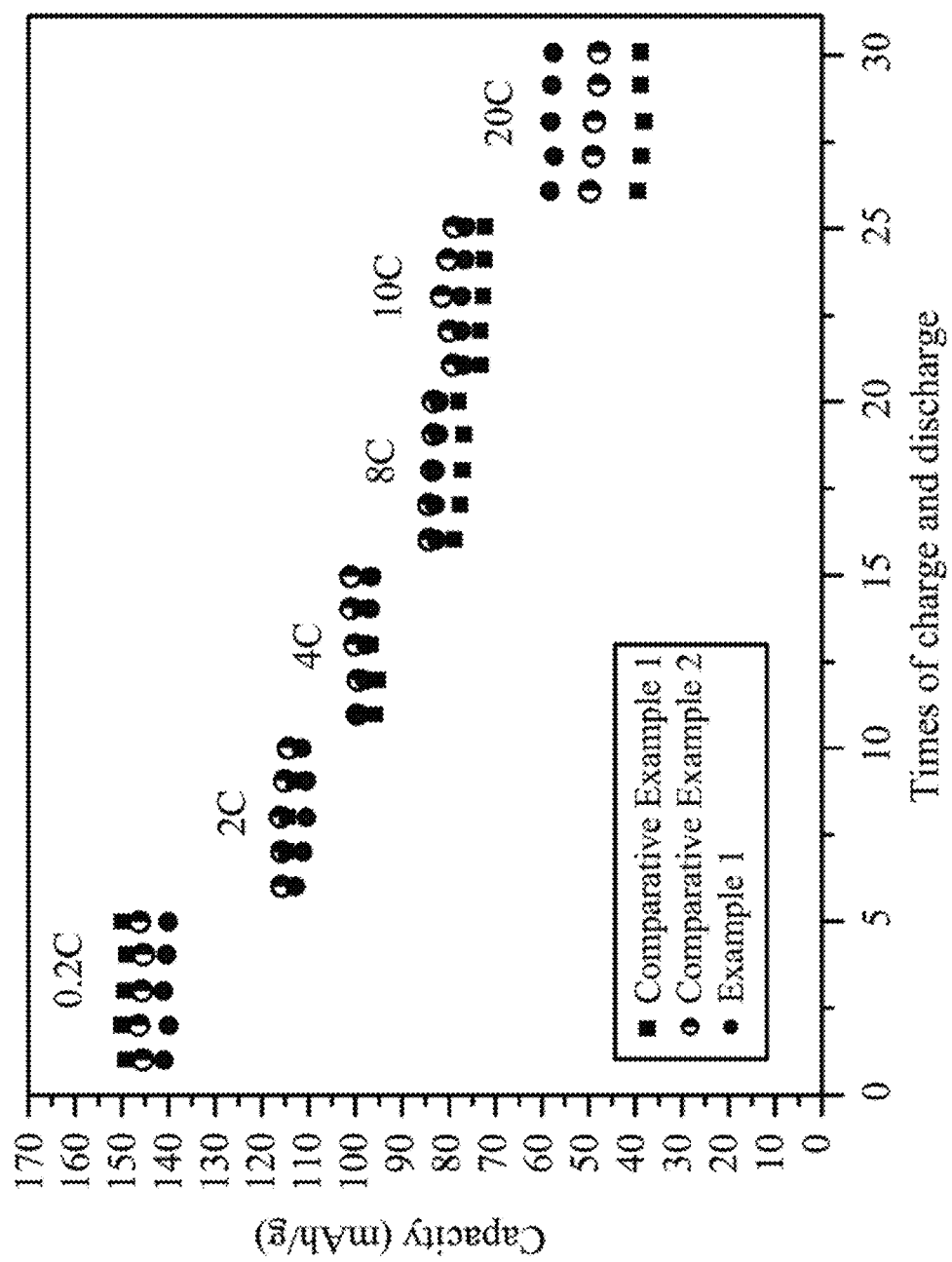
FIG. 10 shows test results of a large current discharge of a button type half battery (lithium iron phosphate/lithium) comprising an electrolyte according to various comparative examples and various examples of the invention.

FIG. 10 shows test results of a large current discharge of a button type half battery (lithium iron phosphate/lithium) comprising various electrolytes according to Example 1 and Comparative Examples 1 and 2. In the tests, the button type half battery comprising the electrolytes in Example 1 and Comparative Examples 1 and 2 were charged at the same speed (0.2 C) and discharged in various speeds (0.2 C, 2 C, 4 C, 8 C, 10 C, 20 C) to perform the battery tests. As shown in FIG. 10, a capacity of the battery was not significantly increased during a low current discharge operation by using the additives in Example 1 and Comparative Example 2. However, with increase of the discharge currents, significant differences happened. The button type half battery using the electrolyte of Example 1 showed a better result than the button type half battery using the electrolyte of Comparative Example 2 during the 20 C charging capacity, which was also better than the button type half battery using the electrolyte of Comparative Example 1 having no additive.

Cycling Life Test

Figure 11:
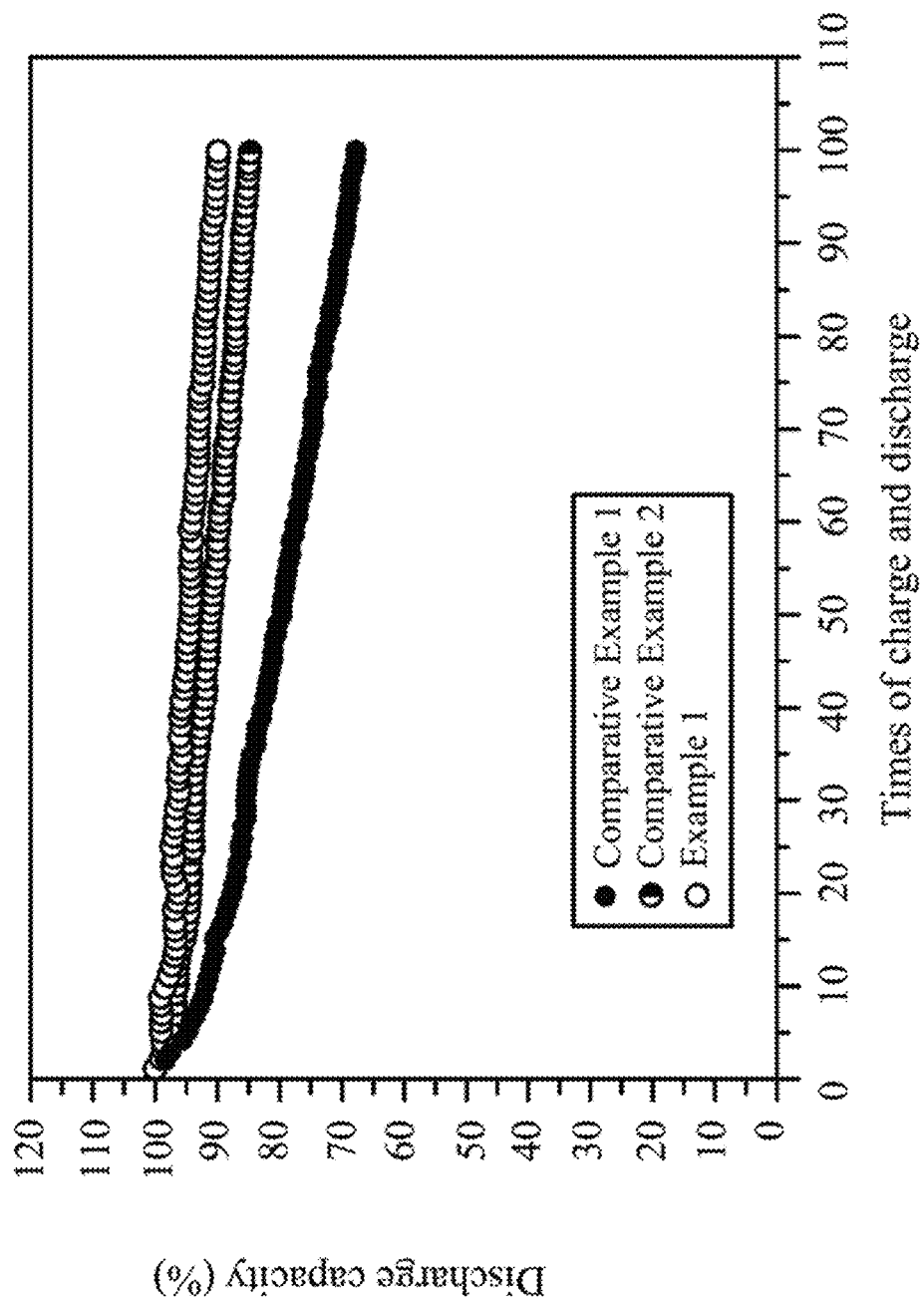
FIG. 11 shows test results of cycle life of a complete button type battery (lithium iron phosphate/MCMB) comprising an electrolyte according to various comparative examples and various examples of the invention.

FIG. 11 shows test results of a cycle life of a complete button type battery (lithium iron phosphate/lithium) comprising various electrolytes according to Example 1 and Comparative examples 1 and 2. As shown in FIG. 11, during a 1 C/1 C charge and discharge speed, a capacity of the battery using the electrolyte of Comparative Example 2 was held at 85% after 100 times of charge and discharge operations. A capacity of the battery using the electrolyte of Comparative Example 1 was held at 67% after 100 times of charge and discharge operations, and a capacity of the battery using the electrolyte of Example 1 was held at 90% after 100 times of charge and discharge operations. Therefore, the electrolyte of Example 1 may ease degradation of the battery capacity.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electrolyte for a lithium ion battery, comprising:
   a carrier;
   a lithium salt dissolved in the carrier; and
   an additive uniformly dispersed in the carrier, wherein the additive is an inorganic clay modified by an organic quaternary phosphonium salt, and the organic quaternary phosphonium salt is intercalated into the inorganic clay, wherein the organic quaternary phosphonium salt is tetrabutylphosphonium hexafluorophosphate and is 0.05-5 wt % in the electrolyte.

2. The electrolyte as claimed in claim 1, wherein the additive comprises a nano layer structure.

3. The electrolyte as claimed in claim 2, wherein the nano layer structure comprises two layers of tetrahedral silicon dioxide and one layer of octahedral aluminum hydroxide.

4. The electrolyte as claimed in claim 1, wherein the additive is about 0.1-5 wt % of the electrolyte.

5. The electrolyte as claimed in claim 1, wherein the carrier comprises cyclic carbonates, chain-shaped carbonates, cyclic ether, or chain-shaped ether.

6. The electrolyte as claimed in claim 1, wherein the lithium salt comprises $LiPF_6$, LiBOB, $LiBF_4$, $LiClO_4$, or a lithium salt having a central atom of C, N, B, or Al.

7. A lithium ion battery, comprising:
   an anode;
   a cathode; and
   an ion-conducting layer sandwiched between the cathode and the anode, wherein the ion-conducting layer comprises the electrolyte as claimed in claim 1.

8. The lithium ion battery as claimed in claim 7, wherein the cathode comprises $LiFePO_4$, $LiMn_2O_4$, $LiCoO_2$, $LiNi_xCo_yO_2$, $LiNi_xMn_yO_4$ or ($LiNi_xCo_yMn_zO_2$).

9. The lithium ion battery as claimed in claim 7, wherein the anode comprises carbon, graphite, mesocarbon microbeads (MCMB), $Li_4Ti_5O_{12}$, or Li.

10. A method for fabricating an electrolyte solution, comprising:
    providing an organic solution;
    providing a modifier to the organic solution, forming a first mixture solution, wherein the modifier comprises an organic quaternary phosphonium salt and the organic quaternary phosphonium salt is tetrabutylphosphonium hexafluorophosphate;
    providing a clay-containing organic solution and mixing the solution with the first mixture solution, forming a second mixture solution, wherein the clay-containing organic solution comprises inorganic clay and the organic quaternary phosphonium salt is intercalated into the inorganic clay; and
    dissolving a lithium salt in the second mixture solution, thereby obtaining the electrolyte solution, wherein the modifier is about 0.05-5 wt % of the electrolyte solution.

11. The method as claimed in claim 10, wherein the inorganic clay is about 0.1-5 wt % of the electrolyte solution.

12. The method as claimed in claim 10, wherein the inorganic clay in the electrolyte solution is modified into hydrophobic clay by the modifier, and the inorganic clay is formed with a nano layer structure.

13. The method as claimed in claim 12, wherein the nano layer structure comprises montmorillonite, beidellite, canbyite, semctite, kaolium, or mica.

14. The method as claimed in claim 10, wherein the organic solution comprises cyclic carbonates, chain-shaped carbonates, cyclic ester, chain-shaped ester or polymer.

15. The method as claimed in claim 10, wherein the lithium salt comprises $LiPF_6$, LiBOB, $LiBF_4$, $LiClO_4$, or a lithium salt having a central atom of C, N, B, or Al.

* * * * *